United States Patent
Li et al.

(10) Patent No.: US 10,628,171 B2
(45) Date of Patent: Apr. 21, 2020

(54) MULTI-OPERATING SYSTEM DEVICE, NOTIFICATION DEVICE AND METHODS THEREOF

(71) Applicant: Huawei Technologies Co., Ltd., Shenzhen (CN)

(72) Inventors: Yong Li, Shenzhen (CN); Guowei Xu, Shenzhen (CN); Bin Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 15/683,044

(22) Filed: Aug. 22, 2017

(65) Prior Publication Data

US 2017/0351529 A1  Dec. 7, 2017

Related U.S. Application Data

(63) Continuation of application No. PCT/CN2015/093236, filed on Oct. 29, 2015.

(30) Foreign Application Priority Data

Feb. 24, 2015 (EP) .................... 15156380

(51) Int. Cl.
  *G06F 9/4401* (2018.01)
  *G06F 9/54* (2006.01)
  *H04B 1/38* (2015.01)

(52) U.S. Cl.
  CPC ........... *G06F 9/441* (2013.01); *G06F 9/4416* (2013.01); *G06F 9/542* (2013.01); *H04B 1/38* (2013.01)

(58) Field of Classification Search
  CPC ........ G06F 9/441; G06F 9/4416; G06F 9/542; H04B 1/38

(Continued)

(56) References Cited

U.S. PATENT DOCUMENTS 6,330,669 B1  12/2001  McKeeth
6,718,482 B2 *  4/2004  Sato .................... G06F 11/0712
                                          714/26

(Continued)

FOREIGN PATENT DOCUMENTS

CN       1906588 A      1/2007
CN     101226489 A      7/2008

(Continued)

OTHER PUBLICATIONS

Machine Translation and Abstract of Chinese Publication No. CN101226489, Jul. 23, 2008, 34 pages.

(Continued)

*Primary Examiner* — Aurel Prifti

(74) *Attorney, Agent, or Firm* — Conley Rose, P.C.

(57) ABSTRACT

The application relates to a multi-operating system (multi-OS) device and a notification device. The multi-OS device comprises a processor, a transceiver, and an output device. The processor is configured to host a first operating system (OS1) in a foreground and a second operating system (OS2) in a background, or vice versa. The output device is configured to be controlled by an operating system hosted in the foreground. The transceiver is configured to receive a first signal ($S_1$) from a notification device over a communication system, where the $S_1$ indicates a notification associated to the OS2. The output device is further configured to output the notification associated to the OS2 when the OS1 is hosted in the foreground.

19 Claims, 3 Drawing Sheets

(58) Field of Classification Search
USPC .................................. 713/1, 2; 718/1, 102
See application file for complete search history.

(56) References Cited

U.S. PATENT DOCUMENTS

| | | | | |
|---|---|---|---|---|
| 6,996,828 | B1* | 2/2006 | Kimura | G06F 9/45537 718/102 |
| 7,409,536 | B2* | 8/2008 | Guo | G06F 9/4843 713/1 |
| 9,189,264 | B1* | 11/2015 | Steffen | G06F 9/542 |
| 2005/0149933 | A1* | 7/2005 | Saito | G06F 9/4843 718/100 |
| 2005/0228769 | A1* | 10/2005 | Oshima | G06F 11/0793 |
| 2006/0294519 | A1* | 12/2006 | Hattori | G06F 9/45558 718/1 |
| 2007/0055860 | A1* | 3/2007 | Wang | G06F 1/3203 713/2 |
| 2007/0277179 | A1* | 11/2007 | Suzuka | G06F 9/544 719/313 |
| 2008/0184274 | A1* | 7/2008 | Ohta | G06F 9/485 719/319 |
| 2009/0049510 | A1* | 2/2009 | Zhang | G06F 21/53 726/1 |
| 2009/0167773 | A1 | 7/2009 | Wang et al. | |
| 2012/0084481 | A1* | 4/2012 | Reeves | G06F 13/14 710/304 |
| 2012/0159144 | A1* | 6/2012 | Sengupta | G06F 9/441 713/100 |
| 2012/0191960 | A1* | 7/2012 | Piwonka | G06F 9/441 713/2 |
| 2012/0246647 | A1* | 9/2012 | Ciano | G06F 9/45533 718/1 |
| 2013/0054955 | A1* | 2/2013 | Oh | G06F 9/4418 713/100 |
| 2013/0072260 | A1* | 3/2013 | Nair | G06F 13/102 455/566 |
| 2013/0247065 | A1* | 9/2013 | Lee | G06F 9/52 718/104 |
| 2014/0115308 | A1* | 4/2014 | Li | G06F 9/4406 713/1 |
| 2015/0254086 | A1* | 9/2015 | Nakajima | G06F 9/45533 718/1 |
| 2015/0277929 | A1* | 10/2015 | Paul | G06F 9/441 713/2 |
| 2016/0098616 | A1* | 4/2016 | Miller | H04L 51/32 709/204 |
| 2016/0124751 | A1* | 5/2016 | Li | G06F 9/45541 380/44 |
| 2017/0010846 | A1* | 1/2017 | Bernstein | G06F 1/165 |

FOREIGN PATENT DOCUMENTS

| | | |
|---|---|---|
| CN | 101477476 A | 7/2009 |
| CN | 103927227 A | 7/2014 |
| CN | 104360900 A | 2/2015 |
| EP | 1031924 A2 | 8/2000 |
| EP | 1887467 A2 | 2/2008 |
| JP | 2000242512 A | 9/2000 |
| JP | 2006127461 A | 5/2006 |
| JP | 2008052714 A | 3/2008 |
| KR | 20130022095 A | 3/2013 |
| TW | 490638 B | 6/2002 |
| WO | 2010137092 A1 | 12/2010 |
| WO | 2015012878 A1 | 1/2015 |

OTHER PUBLICATIONS

Machine Translation and Abstract of Chinese Publication No. CN103927227, Jul. 16, 2014, 17 pages.
Foreign Communication From a Counterpart Application, Chinese Application No. 201580030726.2, Chinese Search Report dated Feb. 13, 2019, 2 pages.
Foreign Communication From a Counterpart Application, Chinese Application No. 201580030726.2, Chinese Office Action dated Mar. 1, 2019, 9 pages.
Machine Translation and Abstract of Chinese Publication No. CN104360900, Feb. 18, 2015, 21 pages.
Machine Translation and Abstract of International Publication No. WO2010137092, Dec. 2, 2010, 34 pages.
Foreign Communication From a Counterpart Application, Taiwanese Application No. 10521445930, Taiwanese Office Action dated Nov. 15, 2016, 8 pages.
Foreign Communication From a Counterpart Application, European Application No. 15156380.6, Extended European Search Report dated Sep. 3, 2015, 7 pages.
Foreign Communication From a Counterpart Application, PCT Application No. PCT/CN2015/093236, English Translation of International Search Report dated Jan. 27, 2016, 8 pages.
Foreign Communication From a Counterpart Application, PCT Application No. PCT/CN2015/093236, English Translation of Written Opinion dated Jan. 27, 2016, 5 pages.
Machine Translation and Abstract of Japanese Publication No. JP2000242512, Sep. 8, 2000, 33 pages.
Machine Translation and Abstract of Japanese Publication No. JP2006127461, May 18, 2006, 37 pages.
Foreign Communication From a Counterpart Application, Korean Application No. 2018-089096434, Korean Notice of Allowance dated Dec. 27, 2018, 3 pages.
Foreign Communication From a Counterpart Application, Korean Application No. 10-2017-7026096, Korean Office Action dated Jul. 12, 2018, 7 pages.
Foreign Communication From a Counterpart Application, Korean Application No. 10-2017-7026096, English Translation of Korean Office Action dated Jul. 12, 2018, 6 pages.

* cited by examiner

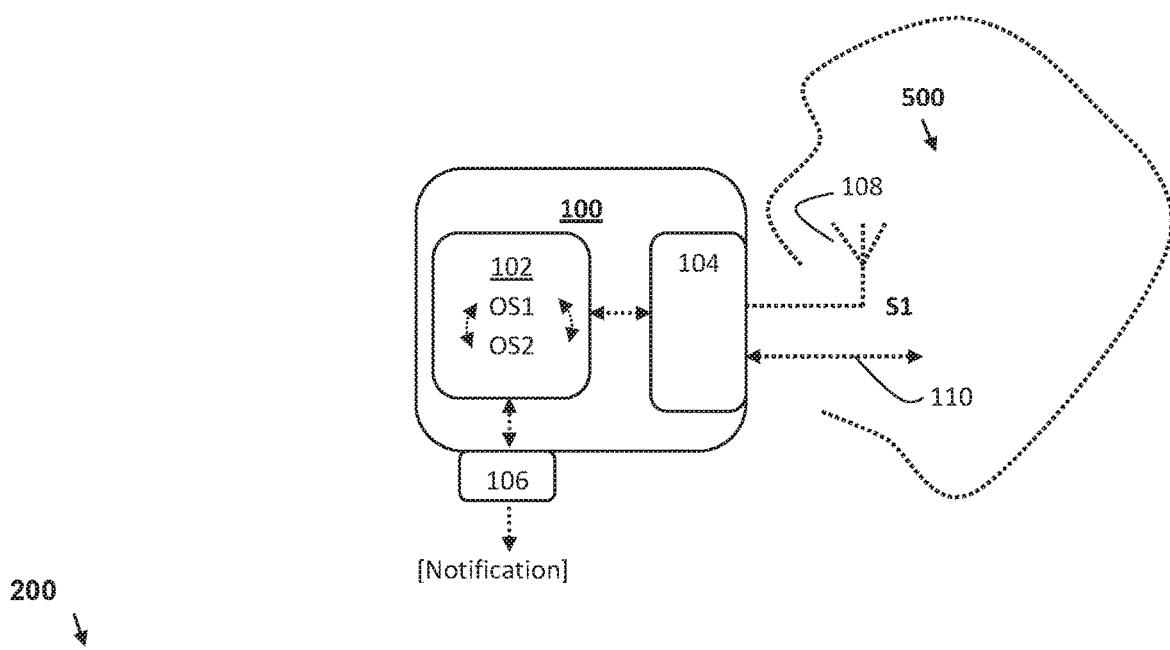

Fig. 1

202 Hosting a first operating system OS1 in the foreground and simultaneously hosting a second operating system OS2 in the background

204 Receiving a first signal $S_1$ from a notification device 300 over a communication system 500, the first signal $S_1$ indicating a notification associated to the second operating system OS2 hosted in the background

206 Outputting the notification associated to the second operating system OS2 hosted in the background when the first operating system OS1 is hosted in the foreground.

Fig. 2

MULTI-OPERATING SYSTEM DEVICE, NOTIFICATION DEVICE AND METHODS THEREOF

CROSS-REFERENCE TO RELATED APPLICATIONS

This application is a continuation of International Patent Application No. PCT/CN2015/093236 filed on Oct. 29, 2015, which claims priority to Europe Patent Application No. EP15156380.6 filed on Feb. 24, 2015. The disclosures of the aforementioned applications are hereby incorporated by reference in their entireties.

TECHNICAL FIELD

The present disclosure relates to a multi-operating system (multi-OS) device and a notification device. Furthermore, the present disclosure also relates to corresponding methods, a computer program, and a computer program product.

BACKGROUND

A so called multi-OS device is a computing device that has two or more Operating Systems (OSs) installed in the computing device. The multi-OS device is usually implemented using dual-boot, hardware virtualization or container techniques. Computing devices include, but are not limited to smartphones, tablets and personal computers (PCs).

There exist many different types of dual boot devices. For example, a tablet that has both WINDOWS OS and ANDROID OS installed. Thereby, the user of the dual boot device can choose which one of the WINDOWS OS or ANDROID OS to use when the computing device is booting. Another example is a PC with both WINDOWS OS and LINUX OS installed. Yet another example is a smartphone that has both ANDROID OS and FIREFOX OS installed.

Multiple OS in a computing device are often installed for security purpose. For example, on a dual-OS device, one OS may be for personal use, and the other OS for enterprise use. However, other use cases having multi-OS installed are also possible.

SUMMARY

An objective of embodiments of the present disclosure is to provide a solution which mitigates or solves the drawbacks and problems of conventional solutions.

An "or" in this description and the corresponding claims is to be understood as a mathematical OR which covers "and" and "or," and is not to be understand as an exclusive OR (XOR).

The above objectives are solved by the subject matter of the independent claims. Further advantageous implementation forms of the present disclosure can be found in the dependent claims.

According to a first aspect of the disclosure, the above mentioned and other objectives are achieved with a multi-OS device comprising a processor, a transceiver, and an output device, where the processor is configured to host a first OS in the foreground and simultaneously host a second OS in the background, or vice versa, where the output device is configured to be controlled by an OS hosted in the foreground, where the transceiver is configured to receive a first signal $S_1$ from a notification device over a communication system, the first signal $S_1$ indicating a notification associated to the second OS hosted in the background, where the output device is further configured to output the notification associated to the second OS hosted in the background when the first OS is hosted in the foreground.

The OS in the foreground controls at least the output device of the multi-OS device. Often, the OS in the foreground also controls more or all further hardware of the multi-OS device. Moreover, the OS in the foreground can also handle user inputs. The OS in the foreground is running in the processor of the multi-OS device.

The OS in the background has no control of the output device or (even) any other hardware resources, when the OS is in the background. The OS in the background cannot receive user inputs. The OS in the background does not have any communication capabilities, such as internet access. Hence, an OS in the background can be regarded as "sleeping" or inactive, with currently no resources (except space on a (non-volatile) memory for storing the OS) assigned to it.

It is understood that the first OS and the second OS are different independent OSs.

A multi-OS device which is configured to output the notification associated to the second OS hosted in the background when the first OS is hosted in the foreground according to embodiments of the present disclosure provides a number of advantages.

An advantage is that notifications associated with the OS in the background can be outputted to the user implying notification handling capabilities for the OS in the background. This is not possible with conventional solutions. Thereby, the OS in the background can be suspended or fully turned off without notification handling being penalized. This implies energy saving in the multi-OS device and no or less use of the system resources of the multi-OS device, such as processor, memory, and internal communication means for hosing the OS in the background. However, the capabilities of receiving notifications associated to the OS in the background are still maintained, as theses notifications can be received by the transceiver (e.g. from a cloud) and be visualized by the output device currently controlled by the OS in the foreground.

In a first possible implementation form of a multi-OS device according to the first aspect, the second OS is not running in the processor when hosted in the background.

With this implementation form the system resources are not used at all which means that all system resources can be used for other applications implying more efficient use of system resources.

In a second possible implementation form of a multi-OS device according to the first possible implementation form of the first aspect or to the first aspect as such, the notification is triggered by the second OS when hosted in the foreground.

With this implementation form notifications triggered by the second OS when currently hosted in the foreground can later be notified to the user when the second OS is hosted in the background. Such a notification could for example be a timer or alarm or reminder, etc. set by a user of device, when the second OS was hosted in the foreground.

In a third possible implementation form of a multi-OS device according to the second possible implementation form of the first aspect, the transceiver is further configured to transmit a second signal $S_2$ to the notification device, the second signal $S_2$ indicating a notification trigger associated to the notification.

With this implementation form notifications triggered by the second OS when hosted in the foreground can later be notified when the second OS is in the background since the notification trigger is transmitted to the notification device (where this notification is registered).

In a fourth possible implementation form of a multi-OS device according to the any of the preceding possible implementation forms of the first aspect or to the first aspect as such, the transceiver is further configured to transmit a third signal $S_3$ to the notification device, the third signal $S_3$ indicating a request for push notification service associated to the second OS when hosted in the background.

With this implementation form the OSs of the multi-OS device can subscribe or request push notification service no matter the OS is hosted in the background or in the foreground. Based on the push notification service, the notification device can send notifications associated to the several OSs as push notifications.

In a fifth possible implementation form of a multi-OS device according to the any of the preceding possible implementation forms of the first aspect or to the first aspect as such, the processor is further configured to install or remove OSs on the multi-OS device. The transceiver is further configured to transmit a fourth signal $S_4$ to the notification device, the fourth signal $S_4$ indicating the installation or removal of an OS on the multi-OS device.

With this implementation form the multi-OS device informs the notification device of the currently installed OSs on the multi-OS device. Thereby, the notification device can manage the notifications for the currently installed OSs in the multi-OS device with the use of corresponding OS delegates efficiently. Hence, the notification device is always aware of the several operation systems installed on the multi-OS device and can host a delegate for each OS currently installed on the multi-OS device.

In a sixth possible implementation form of a multi-OS device according to the any of the preceding possible implementation forms of the first aspect or to the first aspect as such, the processor is configured to move the OS currently hosted in the background to the foreground and to move the OS currently hosted in foreground to the background, and the transceiver is further configured (upon the change of the OS in the foreground) to transmit a fifth signal $S_5$ to the notification device, the fifth signal $S_5$ indicating which OS is currently hosted in the foreground.

With this implementation form the multi-OS device firstly has the capability to move OS between foreground or background mode (e.g. send the first OS to sleep (in the background) and wake (e.g. boot) the second OS. Secondly, the multi-OS device informs the notification device which OS is currently in the foreground and which is in the background so that the notification device can manage and handle notifications for OSs hosted in the multi-OS device even more efficient. As an example, the notification device may send notifications only associated to OSs currently in the background but not associated to OSs currently in the foreground, thereby saving system resources.

In a seventh possible implementation form of a multi-OS device according to the any of the preceding possible implementation forms of the first aspect or to the first aspect as such, the output device is configured to output one or more notification types in the group comprising an audio notification, a visual notification, and a tactile notification.

Therefore, with this implementation form different forms of notifications can be presented to the user of the multi-OS device depending on the application.

According to a second aspect of the disclosure, the above mentioned and other objectives are achieved with a notification device for a multi-OS device, the notification device comprising a processor, and a transceiver, where the processor is configured to host an OS delegate for a corresponding OS hosted on the multi-OS device, where the OS delegate is configured to determine a notification associated to the corresponding OS hosted on the multi-OS device, where the transceiver is configured to transmit a first signal $S_1$ to the multi-OS device over a communication system, the first signal $S_1$ indicating the notification associated to the corresponding OS hosted on the multi-OS device.

With a notification device capable of hosting OS delegates according to embodiments of the present disclosure a number of advantages are provides.

For example, notifications associated with the OS currently in the background of the multi-OS device can be outputted to the user, as these are generated "in the cloud" at the notification device and signalled by the first signal $S_1$ to the multi-OS device. This is not possible with conventional solutions. Thereby, the OS in the background of the multi-OS device can be suspended or fully turned off while the user still can receive notifications associated with the OS currently in the background.

In a first possible implementation form of a notification device according to the second aspect, the transceiver is further configured to receive a second signal $S_2$ from the multi-OS device, the second signal $S_2$ indicating a notification trigger associated to the corresponding OS, the OS delegate is further configured to determine a notification based on the notification trigger.

With this implementation form notifications triggered by an OS in the foreground can be notified to the user when the said OS currently is in the background. This is not possible with conventional solutions.

In a second possible implementation form of a notification device according to the first possible implementation form of the second aspect or to the second aspect as such, the transceiver is further configured to receive a third signal $S_3$ from the multi-OS device, the third signal $S_3$ indicating a request for push notification service associated to the corresponding OS when hosted in the background. The OS delegate is further configured to determine notifications according to the push notification service associated to the corresponding OS.

With this implementation form the OSs of the multi-OS device can receive requested push notification services no matter if the OS is currently hosted in the background or in the foreground.

In a third possible implementation form of a notification device according to any of the preceding possible implementation forms of the second aspect or to the second aspect as such, the transceiver is further configured to receive a sixth signal $S_6$ from a communication device of the communication system, the sixth signal $S_6$ indicating a notification trigger associated to the corresponding OS when hosted in the background. The OS delegate is further configured to determine a notification based on the notification trigger.

With this implementation form notifications triggered by an external communication device can be managed by the OS delegates of the notification device. This also means that notifications triggered by the external communication device can be notified to the user of the multi-OS device even when the associated OS is currently hosted in the background.

In a fourth possible implementation form of a notification device according to any of the preceding possible implementation forms of the second aspect or to the second aspect as such, the processor is further configured to host an OS delegate for each corresponding OS (currently) hosted on the multi-OS device, where the OS delegates are configured to determine notifications associated to the corresponding OSs currently hosted in the background of the multi-OS device, where the transceiver is further configured to transmit first signals $S_1$ to the multi-OS device over a communication system, the first signals $S_1$ indicating the notifications associated to the corresponding OSs.

With this implementation form each OS installed on the multi-OS device has its own corresponding OS delegate which handles the notifications according to the present solution. Thereby, more efficient notification management is possible.

In a fifth possible implementation form of a notification device according to the fourth possible implementation form of the second aspect, the transceiver is further configured to receive a fourth signal $S_4$, the fourth signal $S_4$ indicating the installation or removal of a OS on the multi-OS device. The processor is further configured to, based on the OS indicated in the received fourth signal $S_4$, create (when the corresponding OS indicated was installed on the multi-OS device) or delete (when the corresponding OS indicated was removed from the multi-OS device) a corresponding OS delegate on the notification device.

With this implementation form the notification device is informed of the installed (or active) OSs on the multi-OS device. Thereby, the notification device can manage the notifications for the installed OSs in the multi-OS device with the use of corresponding OS delegates and adapt the number of corresponding OS delegates. Hence, more efficient notification management is possible and system resources can also be used more efficient in the notification device.

In a sixth possible implementation form of a notification device according to the fourth or fifth possible implementation form of the second aspect, the transceiver is further configured to receive a fifth signal $S_5$ indicating which of the OSs hosted on the multi-OS device is currently in the foreground, and the transceiver is further configured to transmit the first signals $S_1$ to the corresponding OS currently hosted in the foreground.

With this implementation form the notification device is informed which OS that is currently in the foreground and which is or are in the background so that the notification device can manage and handle notifications for the OSs hosted in the multi-OS device in even more efficient manner.

In a seventh possible implementation form of a notification device according to the sixth possible implementation form of the second aspect, the transceiver is further configured to transmit first signals $S_1$ indicating notifications associated to the corresponding OSs currently hosted in the background and to omit transmitting first signals $S_1$ indicating notifications associated to the corresponding OS currently hosted in the foreground.

With this implementation form only notifications associated to the corresponding OS(s) currently hosted in the background are transmitted to the multi-OS device. This implies reduced signalling.

According to a third aspect of the disclosure, the above mentioned and other objectives are achieved with a method for a multi-OS device, the method comprising hosting a first OS in the foreground and simultaneously hosting a second OS in the background, receiving a first signal $S_1$ from a notification device over a communication system, the first signal $S_1$ indicating a notification associated to the second OS hosted in the background, outputting the notification associated to the second OS hosted in the background when the first OS is hosted in the foreground.

In a first possible implementation form of a method according to the third aspect, the second OS is not running in the processor when hosted in the background.

In a second possible implementation form of a method according to the first possible implementation form of the third aspect or to the third aspect as such, the notification is triggered by the second OS when hosted in the foreground.

In a third possible implementation form of a method according to the second possible implementation form of the third aspect, the method further comprises transmitting a second signal $S_2$ to the notification device, the second signal $S_2$ indicating a notification trigger associated to the notification.

In a fourth possible implementation form of a method according to the any of the preceding possible implementation forms of the third aspect or to the third aspect as such, the method further comprises transmitting a third signal $S_3$ to the notification device, the third signal $S_3$ indicating a request for push notification service associated to the second OS when hosted in the background.

In a fifth possible implementation form of a method according to the any of the preceding possible implementation forms of the third aspect or to the third aspect as such, the method further comprises installing or remove OSs on the multi-OS device, transmitting a fourth signal $S_4$ to the notification device, the fourth signal $S_4$ indicating the installation or removal of an OS on the multi-OS device.

In a sixth possible implementation form of a method according to the any of the preceding possible implementation forms of the third aspect or to the third aspect as such, the method further comprises moving the OS currently hosted in the background to the foreground and to moving the OS currently hosted in foreground to the background, and transmitting a fifth signal $S_5$ to the notification device (upon the change of the OS in the foreground), the fifth signal $S_5$ indicating which OS is currently hosted in the foreground.

In a seventh possible implementation form of a method according to the any of the preceding possible implementation forms of the third aspect or to the third aspect as such, the method further comprises outputting one or more notification types in the group comprising an audio notification, a visual notification, and a tactile notification.

According to a fourth aspect of the disclosure, the above mentioned and other objectives are achieved with a method for a notification device for a multi-OS device, the method comprising hosting an OS delegate corresponding to an OS hosted on a multi-OS device, determining a notification associated to the corresponding OS hosted on the multi-OS device, transmitting a first signal $S_1$ to the multi-OS device over a communication system, the first signal $S_1$ indicating the notification associated to the corresponding OS hosted on the multi-OS device.

In a first possible implementation form of a method according to the fourth aspect, the method further comprises receiving a second signal $S_2$ from the multi-OS device, the second signal $S_2$ indicating a notification trigger associated to the corresponding OS, determining a notification based on the notification trigger.

In a second possible implementation form of a method according to the first possible implementation form of the fourth aspect or to the fourth aspect as such, receiving a third signal $S_3$ from the multi-OS device, the third signal $S_3$ indicating a request for push notification service associated to the corresponding OS when hosted in the background, determining notifications according to the push notification service associated to the corresponding OS.

In a third possible implementation form of a method according to any of the preceding possible implementation forms of the fourth aspect or to the fourth aspect as such, receiving a fourth signal $S_4$ from a communication device of the communication system, the fourth signal $S_4$ indicating a notification trigger associated to the corresponding OS when hosted in the background, determining a notification based on the notification trigger.

In a fourth possible implementation form of a method according to any of the preceding possible implementation forms of the fourth aspect or to the fourth aspect as such, hosting an OS delegate for each corresponding OS hosted on the multi-OS device, determining notifications associated to the corresponding OSs currently hosted in the background of the multi-OS device, transmitting first signals $S_1$ to the multi-OS device over a communication system, the first signals $S_1$ indicating the notifications associated to the corresponding OSs.

In a fifth possible implementation form of a method according to the fourth possible implementation form of the fourth aspect, the method further comprises receiving a fourth signal $S_4$, the fourth signal $S_4$ indicating the installation or removal of a OS on the multi-OS device, based on the OS indicated in the received fourth signal $S_4$, creating (when the corresponding OS indicated was installed on the multi-OS device) or deleting (when the corresponding OS indicated was removed from the multi-OS device) a corresponding OS delegate on the notification device.

In a sixth possible implementation form of a method according to the fourth or fifth possible implementation form of the fourth aspect, the method further comprises receiving a fifth signal $S_5$ indicating which of the OSs hosted on the multi-OS device is currently in the foreground, and transmitting the first signals $S_1$ to the corresponding OS currently hosted in the foreground.

In a seventh possible implementation form of a method according to the sixth possible implementation form of the fourth aspect, the method further comprises transmitting first signals $S_1$ indicating notifications associated to the corresponding OSs currently hosted in the background and to omit transmitting first signals $S_1$ indicating notifications associated to the corresponding OS currently hosted in the foreground.

The advantages of any method according to the third or fourth aspects are the same as those for the corresponding implementation forms of the multi-OS device according to the first aspect or to the notification device according to the second aspect.

The present disclosure also relates to a computer program, characterized in code means, which when run by processing means causes said processing means to execute any method according to the present disclosure. Further, the disclosure also relates to a computer program product comprising a computer readable medium and said mentioned computer program, where said computer program is included in the computer readable medium, and comprises of one or more from the group Read-Only Memory (ROM), Programmable ROM (PROM), Erasable PROM (EPROM), Flash memory, Electrically EPROM (EEPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure.

FIG. 1 shows a multi-OS device according to an embodiment of the present disclosure;

FIG. 2 shows a method according to an embodiment of the present disclosure;

DETAILED DESCRIPTION

Figure 3:
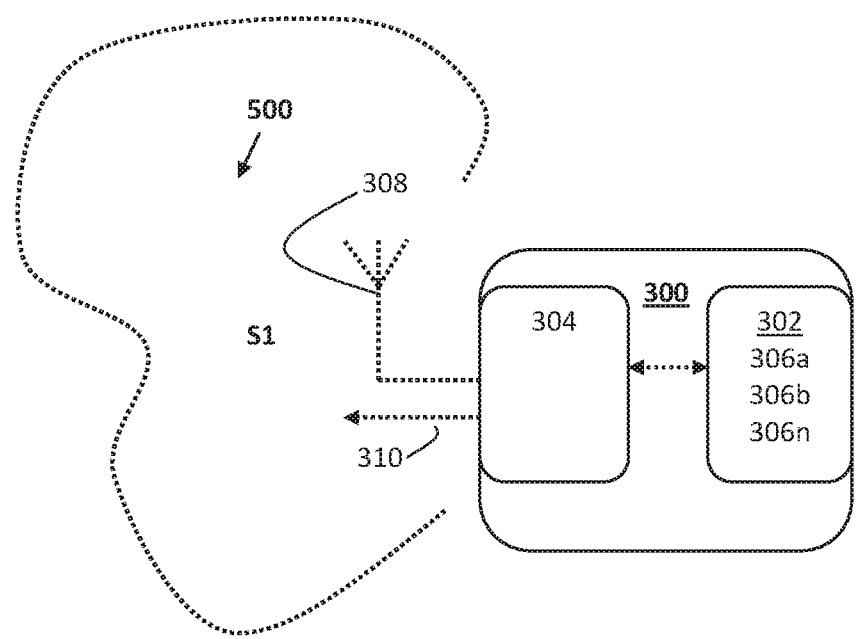
FIG. 3 shows a notification device according to an embodiment of the present disclosure.

An OS hosted in the background cannot notify the user of the multi-OS device according to conventional solutions. Hence, the user will not receive pop up messages, alarms, or other types of notifications associated with the OS hosted in the background. Further, push notifications associated with the OS in the background and generated externally will not either be notified to the user. Generally, with conventional solutions the user will not be able to receive any notifications associated with the OS hosted in the background while another OS is running in the foreground in the multi-OS device.

FIG. 1 shows a multi-OS device 100 according to an embodiment of the present disclosure which solves the above described problem. The multi-OS device 100 is a computing device configured to host two or more OSs. The case of hosting two OSs is often denoted as a dual-OS device. Examples of computing devices with the mentioned capabilities of hosting two or more OSs are smartphones, laptop computers, stationary computers, tablet computers, etc.

The present multi-OS device 100 comprises a transceiver 104 coupled to an optional antenna unit 108 and/or modem unit 110 for wireless and/or wired communications, respectively, in a communication system 500. Wireless communications may be over third generation partnership project (3GPP) radio access networks, WI-FI networks, or any other types of wireless communication systems well known in the art. Wired communications may e.g. be performed according to International Telecommunication Union (ITU) standards or any other suitable wired communication standards.

The present multi-OS device 100 comprises a processor 102 which is coupled to the transceiver 104 with communication means as illustrated with the dashed arrow in FIG. 1. The processor 102 is configured to host two or more independent OSs (designated as OS1 and 052 in the example in FIG. 1). In a certain time instance one OS is hosted in the foreground of the processor 102 and simultaneously at least another OS is hosted in the background. The multi-OS device 100 further comprises at least one output device 106 which is configured to be controlled by the OS hosted and running in the foreground of the processor 102. The output device 106 is further configured to output one or more different types of notifications, such as audio/sound notifications, tactile notifications, visual notifications, etc. The multi-OS device 100 often comprises more than one output device 106 but only one such output device is shown in FIG. 1. For example, a smartphone is often configured to notify the user of all three mentioned types of notifications and therefore comprises at least three output devices or combinations thereof.

The transceiver 104 of the multi-OS device 100 is according to embodiments of the present disclosure configured to receive a first signal $S_1$ from a notification device (not shown) over the communication system 500. The first signal $S_1$ as shown in FIG. 1 indicates a notification associated to a second OS OS2 currently hosted in the background. Furthermore, the output device 106 of the multi-OS device 100 is configured to output the notification associated to the second OS OS2 when the first OS OS1 is currently hosted in the foreground. This means that the first OS OS1 running in the foreground, on behalf of the second OS OS2 in the background, controls the output device 106 such that notifications associated with the second OS OS2 are outputted to the user. As described above, the multi-OS device 100 receives the first signal $S_1$ from the notification device. The notification device handles notifications on behalf of OSs hosted in the background in the multi-OS device 100. Thereby, notifications associated with OSs in the background can be notified to the user.

FIG. 2 shows, with respect to the FIG. 1, a flowchart of a corresponding method which may be executed in a multi-OS device 100, such as the one shown in FIG. 1. The method 200 comprises a step 202 of hosting a first operating system OS1 in the foreground and simultaneously hosting a second operating system OS2 in the background. The method 200 further comprises a step 204 of receiving a first signal $S_1$ from a notification device 300 over a communication system 500, the first signal $S_1$ indicating a notification associated to the second operating system OS2 hosted in the background. Finally, the method 200 comprises a step 206 of outputting the notification associated to the second operating system OS2 hosted in the background when the first operating system OS1 is hosted in the foreground.

FIG. 3 shows a notification device 300 according to an embodiment of present disclosure. The notification device 300 comprises a processor 302 configured to host OS delegates 306a, 306b, . . . , 306n (where n denotes the number of OS delegates in the notification device 300). Each OS delegate 306 is configured to handle notifications for its Corresponding OS (COS) in a multi-OS device (not shown). In this respect, the OS delegate 306 is configured to determine a notification for a COS hosted on the multi-OS device. When a notification is to be notified to the user of the multi-OS device and the COS is hosted in the background of the multi-OS device, the notification device 300 transmits the first signal $S_1$ to the multi-OS device. Hence, a transceiver 304 of the notification device 300 is configured to transmit the first signal $S_1$ indicating the notification associated to the COS hosted on the multi-OS device. The processor 302 and the transceiver 304 of the notification device 300 are communicably coupled to each other with communication means illustrated with the dashed arrow in FIG. 3. The notification device 300 may also comprise optional antenna unit 308 and/or modem unit 310 for wireless and/or wired communications, respectively, in the communication system 500 as described above. The mentioned OS delegates 306a, 306b, . . . , 306n can be implemented as software applications running in the processor 302 of the notification device 300.

Figure 4:
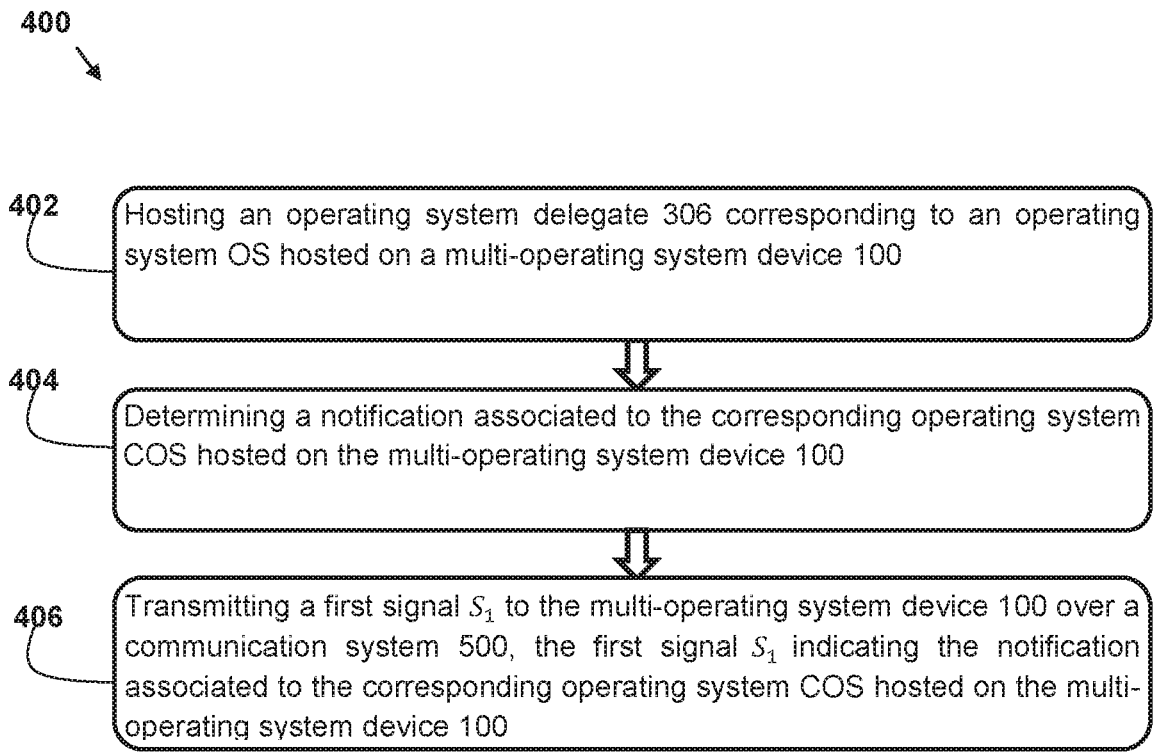
FIG. 4 shows another method according to an embodiment of the present disclosure.

FIG. 4 shows, with respect to the FIG. 1 and FIG. 3, a flowchart of a corresponding method which may be executed in a notification device 300, such as the one shown in FIG. 3. The method 400 comprises a step 402 of hosting an OS delegate 306 corresponding to an OS hosted on a multi-OS device 100. The method further comprises a step 404 of determining a notification associated to the corresponding operating system COS hosted on the multi-operating system device 100. The method further comprises a step 406 of transmitting a first signal $S_1$ to the multi-operating system device 100 over a communication system 500, the first signal $S_1$ indicating the notification associated to the corresponding operating system COS hosted on the multi-operating system device 100.

The present notification device 300 as shown in FIG. 3 may be a network server providing cloud services of the kind explained above to the multi-OS device 100 which therefore acts as a client. Embodiments of the present disclosure therefore manifests the present inventive idea to have corresponding OS delegates in a remote device, i.e. the notification device 300 is configured to control and handle notifications for the different OSs hosted in the multi-OS device. The OS delegates 306a, 306b, . . . , 306n can receive notifications on behalf of a background COS and forward the notifications to another OS which is in the foreground of the multi-OS device.

Figure 5:
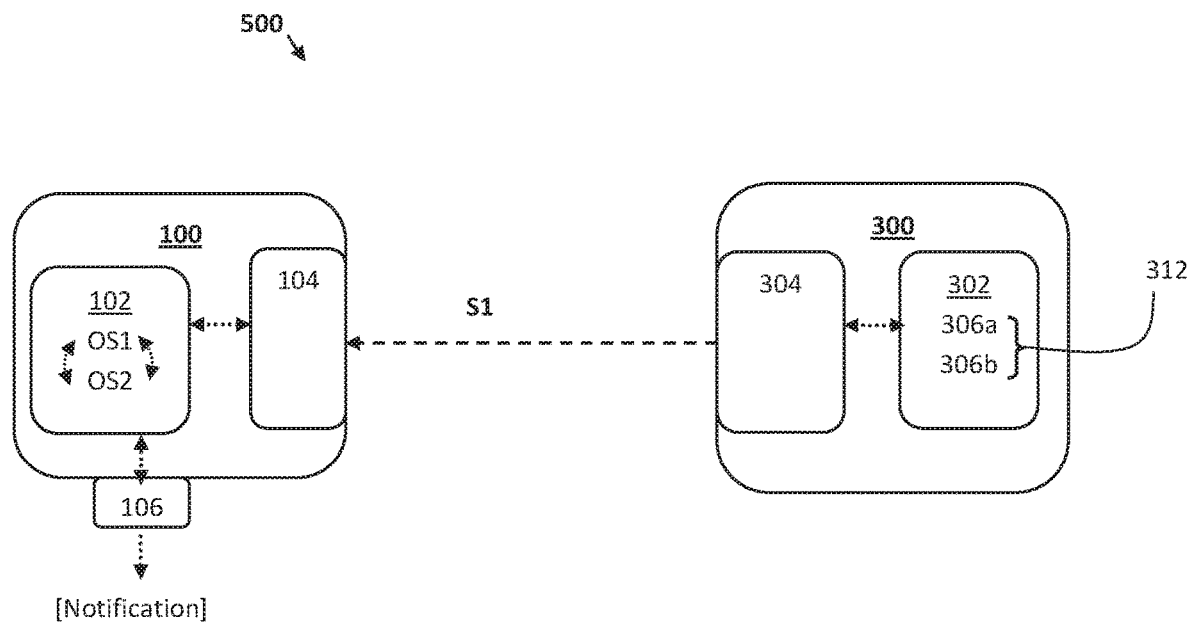
FIG. 5 illustrates signalling aspects according to an embodiment of the present disclosure.

This is illustrated in FIG. 5 which shows signalling aspects in a communication system 500 according to an embodiment of the present disclosure. In this example, OS1 and OS2 are hosted by the multi-OS device 100. Either, OS1 is in the foreground and the OS2 is in the background, or vice versa. It is further shown in the notification device 300 that COS delegates 306a (for OS1) and 306b (for OS2) are hosted in the processor 302 of the notification device 300. This means that each OS on the multi-OS device 100 has a COS delegate in the notification device 300 that can be reachable through e.g. Internet. Further, for every multi-OS device 100, there may be an OS delegate manager 312 in the notification device 300 that manages the OS delegates and knows which OS is the current foreground OS running on the multi-OS device 100, and which OS(s) is in background, etc. The OS delegate manager 312 is therefore an entity in the notification device 300 that is responsible for, and controls all OS delegates 306a, 306b, . . . , 306n for a specific multi-OS device 100. The notification device 300 can host a plurality of OS delegate managers, and each OS delegate manager 312 is associated with its own multi-OS device 100. To effectively achieve the above, specific capabilities in the multi-OS device 100 and the notification device 300, and interaction between the multi-OS device 100 and the notification device 300 will be described in the following.

According to another embodiment of the present disclosure the processor 102 of the multi-OS device 100 is further configured to install or remove OSs on the multi-OS device 100. The transceiver 104 of the multi-OS device 100 is further configured to transmit a fourth signal $S_4$ (see FIG. 6) to the notification device 300 over the communication system 500. The fourth signal $S_4$ indicates the installation or removal of an OS on the multi-OS device 100. At the receiver side, the transceiver 304 of the notification device 300 is configured to receive the fourth signal $S_4$. Further, the processor 302 of the notification device 300 is configured to create or delete a corresponding OS delegate 306a, 306b, . . . , 306n on the notification device 300 based on the information in the fourth signal $S_4$. This signalling is illustrated in FIG. 6 and the creation or deletion of corresponding OS delegates is handled by the mentioned OS delegate manager 312.

For improved notification management, the processor 102 of the multi-OS device 100 is further configured to move the OS currently hosted in the background to the foreground and to move the OS currently hosted in foreground to the background. Further, the transceiver 104 of the multi-OS device 100 is further configured to transmit this information in a fifth signal $S_5$ to the notification device 300. Hence, the fifth signal $S_5$ indicates which OS is currently hosted in the foreground. The notification device 300 receives the fifth signal $S_5$ and derives the information in the fifth signal $S_5$. The derived information is used by the OS delegate 306 and/or the OS delegate manager 312 when first signals $S_1$ are transmitted to the corresponding OS COS1, COS2, . . . , COSn currently hosted in the foreground of the multi-OS device 100.

Figure 6:
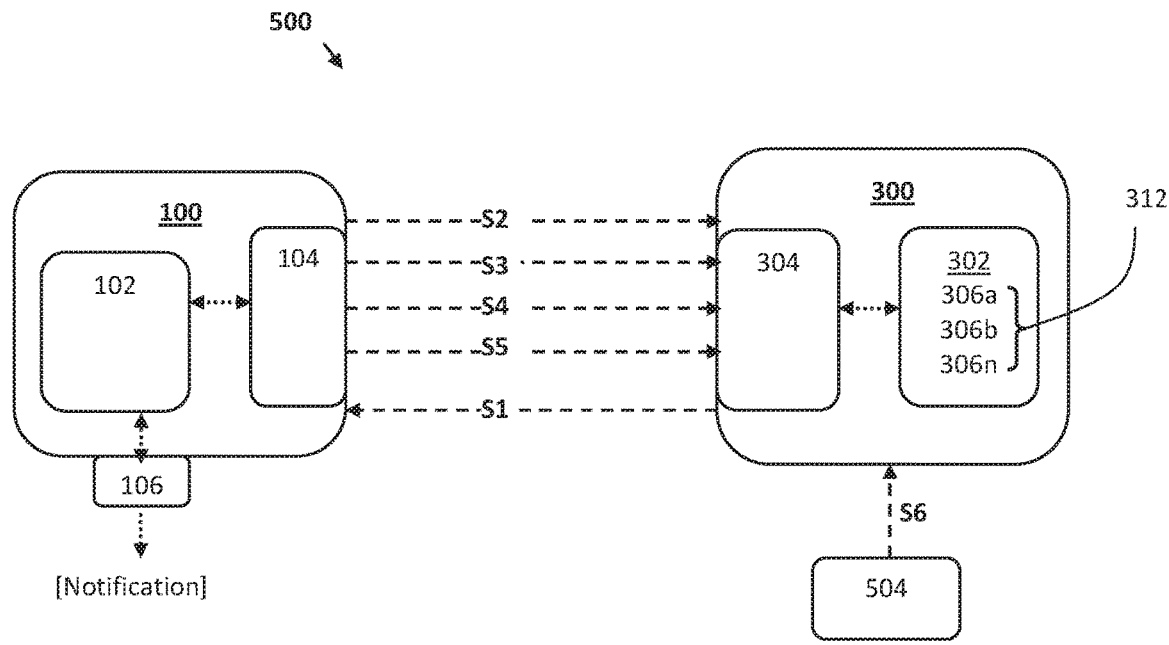
FIG. 6 illustrates further signalling aspects according to embodiments of the present disclosure.

FIG. 6 also shows yet further signalling aspects between the multi-OS device 100 and the notification device 300.

The second signal $S_2$ transmitted by the multi-OS device 100 indicates a notification trigger associated to the notification. This is the case when the notification (such as an alarm or timer or a reminder, etc.) is triggered by an OS hosted in the foreground of the multi-OS device 100 (a so called internal notification) but is to be notified when the said OS is hosted in the background. The notification device 300 receives the second signal $S_2$ and the notification trigger is handled by the corresponding OS delegate 306a, 306b, . . . , 306n which, based on the notification trigger, determines a notification and transmits the notification in the first signal $S_1$ to the multi-OS device 100 at the correct time instance.

The third signal $S_3$ transmitted by the multi-OS device 100 indicates a request for push notification service associated to an OS when hosted in the background of the multi-OS device 100. The notification device 300 receives the third signal $S_3$ which indicates the request for push notification service. The corresponding OS delegate, i.e. one of 306a, 306b, . . . , 306n, is further configured to determine notifications according to the push notification service. Thereby, an OS at the multi-OS device 100 can subscribe to a push notification service and notifications associated with the said OS can be notified to the user of the multi-OS device 100 no matter if the said OS is currently hosted in the foreground or in the background. The OS delegate manager 312 can therefore provide the push notification service to the multi-OS device 100. So when an OS is brought to foreground, it registers itself to the push notification service handled by the OS delegate manager 312. Hence, the OS delegate manager 312 can push notifications to the foreground OS for all OSs in the multi-OS device 100.

A convenient way to register to a push notification service is by sending a Hypertext transfer Protocol (HTTP) request (or any other suitable protocol request, possibly including a request message) to the notification device 300 (acting as a server). The notification device 300 does not need reply to the request but keeps the connection active until there is a notification to dispatch to the multi-OS device 100. Otherwise the request can time out, e.g. after 15 minutes. Thereafter, the multi-OS device 100 (acting as a client) will send a new HTTP request to the notification device 300, and so on. The OS that is hosted in the foreground can also register to the push notification service. Generally, the HTTP request can include the identity (ID) of the OS, such as OS ID or any other name that can be used by the server to identify the OS, the multi-OS device 100 ID, and optionally the user ID and possibly a password for verification and improved security.

FIG. 6 also illustrates the case when the notification is triggered by an external communication device 504 of the communication system 500, i.e. a so called external notification. The external communication device 504 may be another computing device, a server, a service host unit, another dedicated notification device, or any other communication device 504 which is configured to generate notification trigger(s) for the multi-OS device 100 and to address the multi-OS device 100 via its corresponding OS delegates 306a, 306b, . . . , 306n and/or OS delegate manager 312. The external communication device 504 transmits a sixth signal $S_6$ to the notification device 300. An OS delegate 306 associated with the sixth signal $S_6$ processes the notification trigger of the sixth signal $S_6$ and determines a notification based on the notification trigger. Thereafter, the transceiver 304 sends the notification in a first signal $S_1$ to the multi-OS device 100 as described above.

In the above described solutions, the multi-OS device 100 relies on communication connectivity (such as access to the Internet) to receive internal notifications from background OSs. Also it may be complicated to make an OS delegate 306 raise internal notifications like location-based notifications. This can be solved by a hybrid solution while external notifications are handled by OS delegates 306a, 306b, . . . , 306n, internal notifications of a OS in the background are still triggered in the multi-OS device 100 locally using other methods. The difference is that internal notifications of OSs currently in the background are not raised by their own corresponding OS delegates 306a, 306b, . . . , 306n in the notification device 300. Instead, such internal notifications are handled internally in the multi-OS device 100 with internal methods. Therefore, according to this solution only external notifications are dispacted from the notification device 300 to the multi-OS device 100.

Furthermore, any method according to the present disclosure may be implemented in a computer program, having code means, which when run by processing means causes the processing means to execute the steps of the method. The computer program is included in a computer readable medium of a computer program product. The computer readable medium may comprise of essentially any memory, such as a ROM, a PROM, an EPROM, a Flash memory, an EEPROM, or a hard disk drive.

Moreover, it is realized by the skilled person that the present multi-OS device 100 and notification device 300 further comprises necessary communication capabilities in the form of e.g., functions, means, units, elements, etc., for performing the present solution. Examples of such means, units, elements and functions are processors, memory, buffers, control logic, encoders, decoders, rate matchers, de-rate matchers, mapping units, multipliers, decision units, selecting units, switches, interleavers, de-interleavers, modulators, demodulators, input means, output means, screens, displays, antennas, amplifiers, receiver units, transmitter units, digital signal processors (DSPs), mass storage devices (MSDs), trellis-coded modulation (TCM) encoder, TCM decoder, power supply units, power feeders, communication interfaces, communication protocols, etc. which are suitably configured together for implementing and/or executing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A multi-operating system (multi-OS) device, comprising:
an output device;
a processor coupled to the output device and configured to:
simultaneously host a first operating system (OS1) in a foreground and a second operating system (OS2) in a background; and
control the output device using the OS1 running in the foreground; and
a transceiver coupled to the processor and configured to receive a first signal ($S_1$) from a notification device over a communication system, wherein the notification device is external to the multi-OS device, and wherein the $S_1$ indicates a notification associated with the OS2 hosted in the background and includes an instruction for the output device controlled using the OS1 running in the foreground to output the notification associated with the OS2 hosted in the background, and
wherein the output device is further configured to output the notification associated with the OS2 hosted in the background in response to receiving the $S_1$.

2. The multi-OS device according to claim 1, wherein the OS2 is not running in the processor.

3. The multi-OS device according to claim 2, wherein the notification comprises at least one of an audio notification, tactile notification, or visual notification.

4. The multi-OS device according to claim 3, wherein the transceiver is further configured to transmit a second signal ($S_2$) to the notification device, and wherein the $S_2$ indicates a notification trigger associated with the notification.

5. The multi-OS device according to claim 4, wherein the transceiver is further configured to transmit a third signal ($S_3$) to the notification device, and wherein the $S_3$ indicates a request for push notification service associated with the OS2.

6. The multi-OS device according to claim 1, wherein the processor is further configured to install operating systems (OSs) on the multi-OS device, wherein the transceiver is further configured to transmit a fourth signal ($S_4$) to the notification device indicating an installation of an OS on the multi-OS device.

7. The multi-OS device according to claim 1, wherein the processor is further configured to remove operating systems (OSs) on the multi-OS device, wherein the transceiver is further configured to transmit a fourth signal ($S_4$) indicating a removal of an OS on the multi-OS device.

8. The multi-OS device according to claim 1, wherein the processor is further configured to move the OS2 hosted in the background to the foreground and the OS1 running in foreground to the background, wherein the transceiver is further configured to transmit a fifth signal ($S_5$) to the notification device indicating which operating system is currently running in the foreground.

9. A method for a multi-operating system (multi-OS) device, comprising:
simultaneously hosting a first operating system (OS1) in a foreground and a second operating system (OS2) in a background;
controlling an output device of the multi-OS device using the OS1 running in the foreground;
receiving a first signal ($S_1$) from a notification device over a communication system, wherein the notification device is external to the multi-OS device, and wherein the $S_1$ indicates a notification associated with the OS2 hosted in the background and includes an instruction for the output device controlled using the OS1 running in the foreground to output the notification associated with the OS2 hosted in the background; and
outputting the notification associated with the OS2 hosted in the background using the output device of the multi-OS device in response to receiving the $S_1$.

10. The method according to claim 9, wherein the OS2 is not running in the processor.

11. The method according to claim 9, wherein the notification comprises at least one of an audio notification, tactile notification, or visual notification.

12. The method according to claim 9, further comprising transmitting a second signal ($S_2$) to the notification device, and wherein the $S_2$ indicates a notification trigger associated with the notification.

13. The method according to claim 9, further comprising transmitting a third signal ($S_3$) to the notification device, and wherein the $S_3$ indicates a request for push notification service associated with the OS2.

14. The method according to claim 9, further comprising installing operating systems (OSs) on the multi-OS device, wherein the transceiver is further configured to transmit a fourth signal ($S_4$) to the notification device indicating an installation of an OS on the multi-OS device.

15. A computer program product comprising computer-executable instructions for storage on a non-transitory computer-readable medium that, when executed by a processor of a device, cause the device to:
simultaneously host a first operating system (OS1) in a foreground and a second operating system (OS2) in a background;
control an output device of the multi-OS device using the OS1 running in the foreground;
receive a first signal ($S_1$) from a notification device over a communication system, wherein the notification device is external to the multi-OS device, and wherein the $S_1$ indicates a notification associated with the OS2 hosted in the background and includes an instruction for the output device controlled using the OS1 running in the foreground to output the notification associated with the OS2 hosted in the background; and
output the notification associated with the OS2 hosted in the background using the output device of the multi-OS device in response to receiving the $S_1$.

16. The computer program product according to claim 15, wherein the notification comprises at least one of an audio notification, tactile notification, or visual notification.

17. The computer program product according to claim 15, wherein the instructions further cause the device to transmit a second signal ($S_2$) to the notification device, and wherein the $S_2$ indicates a notification trigger associated with the notification.

18. The computer program product according to claim 15, wherein the instructions further cause the device to transmit a third signal ($S_3$) to the notification device, and wherein the $S_3$ indicates a request for push notification service associated with the OS2.

19. The computer program product according to claim 15, wherein the instructions further cause the device to install operating systems (OSs) on the multi-OS device, wherein the transceiver is further configured to transmit a fourth signal ($S_4$) to the notification device indicating an installation of an OS on the multi-OS device.

* * * * *